United States Patent
Zhang et al.

(10) Patent No.: US 10,102,323 B2
(45) Date of Patent: *Oct. 16, 2018

(54) MICRO-BENCHMARK ANALYSIS OPTIMIZATION FOR MICROPROCESSOR DESIGNS

(71) Applicant: ORACLE INTERNATIONAL CORPORATION, Redwood City, CA (US)

(72) Inventors: Haowei Zhang, Santa Clara, CA (US); Xiaoying Shen, Austin, TX (US); Sebastian Turullols, Los Altos, CA (US)

(73) Assignee: Oracle International Corporation, Redwood City, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/291,459

(22) Filed: Oct. 12, 2016

(65) Prior Publication Data

US 2017/0132344 A1 May 11, 2017

Related U.S. Application Data

(63) Continuation of application No. 14/293,763, filed on Jun. 2, 2014, now Pat. No. 9,483,603.

(51) Int. Cl.
*G06F 17/50* (2006.01)
*G06F 17/11* (2006.01)
*G06F 17/16* (2006.01)

(52) U.S. Cl.
CPC ......... *G06F 17/5036* (2013.01); *G06F 17/11* (2013.01); *G06F 17/16* (2013.01); *G06F 17/5009* (2013.01); *G06F 17/5031* (2013.01); *G06F 17/5081* (2013.01); *G06F 2217/84* (2013.01); *G06F 2217/86* (2013.01)

(58) Field of Classification Search
CPC ............ G06F 17/5022; G06F 17/5081; G06F 17/5009
USPC ............ 716/106, 111, 136, 109; 703/16, 18
See application file for complete search history.

(56) References Cited

U.S. PATENT DOCUMENTS

| | | | |
|---|---|---|---|
| 9,483,603 B2 * | 11/2016 | Zhang | G06F 17/5081 |
| 2006/0080625 A1 * | 4/2006 | Bose | G06F 17/5022 |
| | | | 703/21 |
| 2007/0078641 A1 * | 4/2007 | Bank | G06F 11/3428 |
| | | | 703/22 |

(Continued)

FOREIGN PATENT DOCUMENTS

JP 2002323992 A * 11/2002

*Primary Examiner* — Phallaka Kik
(74) *Attorney, Agent, or Firm* — Marsh Fischmann & Breyfogle LLP; Jonathon A. Szumny

(57) ABSTRACT

Embodiments include systems and methods for optimization of micro-benchmark analysis for microprocessor designs. For example, embodiments seek to generate a suite of micro-benchmarks and associated weighting factors, which can be used to effectively define a weighted aggregate workload condition for a fine-grained (e.g., RTL) simulation in a manner that is a sufficient proxy for predicted commercial workload conditions. The suite of micro-benchmarks can be appreciably more efficient to simulate than the commercial workload, so that using the suite of micro-benchmarks as a proxy for the commercial workload can provide many benefits, including more efficient iterative design.

8 Claims, 4 Drawing Sheets

(56) References Cited

U.S. PATENT DOCUMENTS

| | | | |
|---|---|---|---|
| 2010/0050008 A1* | 2/2010 | Allalouf | G06F 1/32 |
| | | | 713/340 |
| 2013/0097426 A1* | 4/2013 | Agrawal | G06F 9/452 |
| | | | 713/176 |
| 2016/0098810 A1* | 4/2016 | Agrawal | G06F 9/452 |
| | | | 382/100 |
| 2017/0132344 A1* | 5/2017 | Zhang | G06F 17/5036 |

* cited by examiner

MICRO-BENCHMARK ANALYSIS OPTIMIZATION FOR MICROPROCESSOR DESIGNS

FIELD

Embodiments relate generally to microprocessor analysis, and, more particularly, to optimization of micro-benchmark analysis for microprocessor designs.

BACKGROUND

Many factors are included in a microprocessor design process to ensure that the microprocessor will operate as expected across anticipated, and even many unanticipated, workload conditions. Many processes use both higher-level models of the microprocessor design (e.g., coarse-grained models, such as so-called "performance models") and lower-level models of the microprocessor design (e.g., fine-grained models, such as so-called "register transfer logic (RTL) models") to evaluate designs. The higher-level models tend to facilitate simulation of longer running workloads (e.g., expected commercial workloads) and can be well-suited for exploring and evaluating key parameters, but they tend not to approach the detail of lower-level models until late in the design process. The lower-level models tend to facilitate more detailed analyses, such as of activity factors and clock-gating opportunities, but their simulations tend to be appreciably more time-intensive and resource-intensive. For example, RTL-based simulations can tend to be impractical for simulating long-running, commercial workloads (e.g., an actual expected workload), such as Standard Performance Evaluation Corporation's (SPEC) standard central processing unit (CPU) workload ("SPEC CPU"), Java business benchmark workload ("SPEC JBB"), Java enterprise edition workload ("SPEC jEnterprise"), etc.

When using lower-level (e.g., RTL) models, simulations often employ "micro-benchmarks" that define specific conditions using appreciably smaller instructions sets to allow the lower-level simulation to run within a reasonable amount of time. For example, tens to hundreds of instructions can correspond to kernels in common algorithms. While such micro-benchmarks are commonly used for power optimization of microprocessor designs, the workload conditions provided by those micro-benchmarks are often appreciably different from dynamic or average behaviors of actual workload conditions.

BRIEF SUMMARY

Among other things, embodiments provide novel systems and methods for optimization of micro-benchmark analysis for microprocessor designs. For example, embodiments seek to generate a suite of micro-benchmarks and associated weighting factors, which can be used to effectively define a weighted aggregate workload condition for a fine-grained (e.g., RTL) simulation in a manner that is a sufficient proxy for predicted commercial workload conditions. The suite of micro-benchmarks can be appreciably more efficient to simulate than the commercial workload, so that using the suite of micro-benchmarks as a proxy for the commercial workload can provide many benefits, including more efficient iterative design.

According to one set of embodiments, a method is provided for optimizing micro-benchmark analysis of a microprocessor design. The method includes: identifying a suite of micro-benchmarks, each corresponding to a micro-benchmark workload condition for the microprocessor design; simulating, under each micro-benchmark workload condition, fine-grained operation of the microprocessor design to generate a set of micro-benchmark activity factors for the micro-benchmark workload condition, each micro-benchmark activity factor indicating an amount of activity monitored for a respective one of a number of sub-units of the microprocessor design under the micro-benchmark workload condition; simulating coarse-grained operation of the microprocessor design to generate a set of commercial workload activity factors, each commercial workload activity factor indicating an amount of activity monitored for each respective one of the number of sub-units of the microprocessor design under a commercial workload condition; and calculating a set of weighting factors as a function of the micro-benchmark activity factors and the commercial workload activity factors to apply to the suite of micro-benchmarks to yield a weighted aggregate micro-benchmark workload condition that substantially approximates the commercial workload condition.

According to another set of embodiments, a system is provided for optimizing micro-benchmark analysis of a microprocessor design. The system includes: a non-transient memory having stored thereon an architectural power model of the microprocessor design; first and second computer-implemented circuit simulators; and a computer-implemented solver. The first computer-implemented circuit simulator operates to: identify a suite of micro-benchmarks, each corresponding to a micro-benchmark workload condition for the microprocessor design; and simulate, under each micro-benchmark workload condition, fine-grained operation of the architectural power model to generate a set of micro-benchmark activity factors for the micro-benchmark workload condition, each micro-benchmark activity factor indicating an amount of activity monitored for a respective one of a number of sub-units of the architectural power model under the micro-benchmark workload condition. The second computer-implemented circuit simulator operates to simulate coarse-grained operation of the architectural power model to generate a set of commercial workload activity factors, each commercial workload activity factor indicating an amount of activity monitored for each respective one of the number of sub-units of the architectural power model under a commercial workload condition. The computer-implemented solver operates to calculate a set of weighting factors as a function of the micro-benchmark activity factors and the commercial workload activity factors to apply to the suite of micro-benchmarks to yield a weighted aggregate micro-benchmark workload condition that substantially approximates the commercial workload condition.

According to another set of embodiments, another system is provided. The system includes a set of processors and a non-transient memory. The memory has stored thereon an architectural power model of the microprocessor design and instructions for optimizing micro-benchmark analysis of a microprocessor design. The instructions, when executed, cause the set of processors to perform steps including: identifying a suite of micro-benchmarks, each corresponding to a micro-benchmark workload condition for the microprocessor design; simulating, under each micro-benchmark workload condition, fine-grained operation of the architectural power model to generate a set of micro-benchmark activity factors for the micro-benchmark workload condition, each micro-benchmark activity factor indicating an amount of activity monitored for a respective one of a number of sub-units of the architectural power model under the micro-benchmark workload condition; simulating coarse-grained operation of the architectural power model to generate a set of commercial workload activity factors, each commercial workload activity factor indicating an amount of activity monitored for each respective one of the number of sub-units of the architectural power model under a commercial workload condition; and calculating a set of weighting factors as a function of the micro-benchmark activity factors and the commercial workload activity factors to apply to the suite of micro-benchmarks to yield a weighted aggregate micro-benchmark workload condition that substantially approximates the commercial workload condition.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
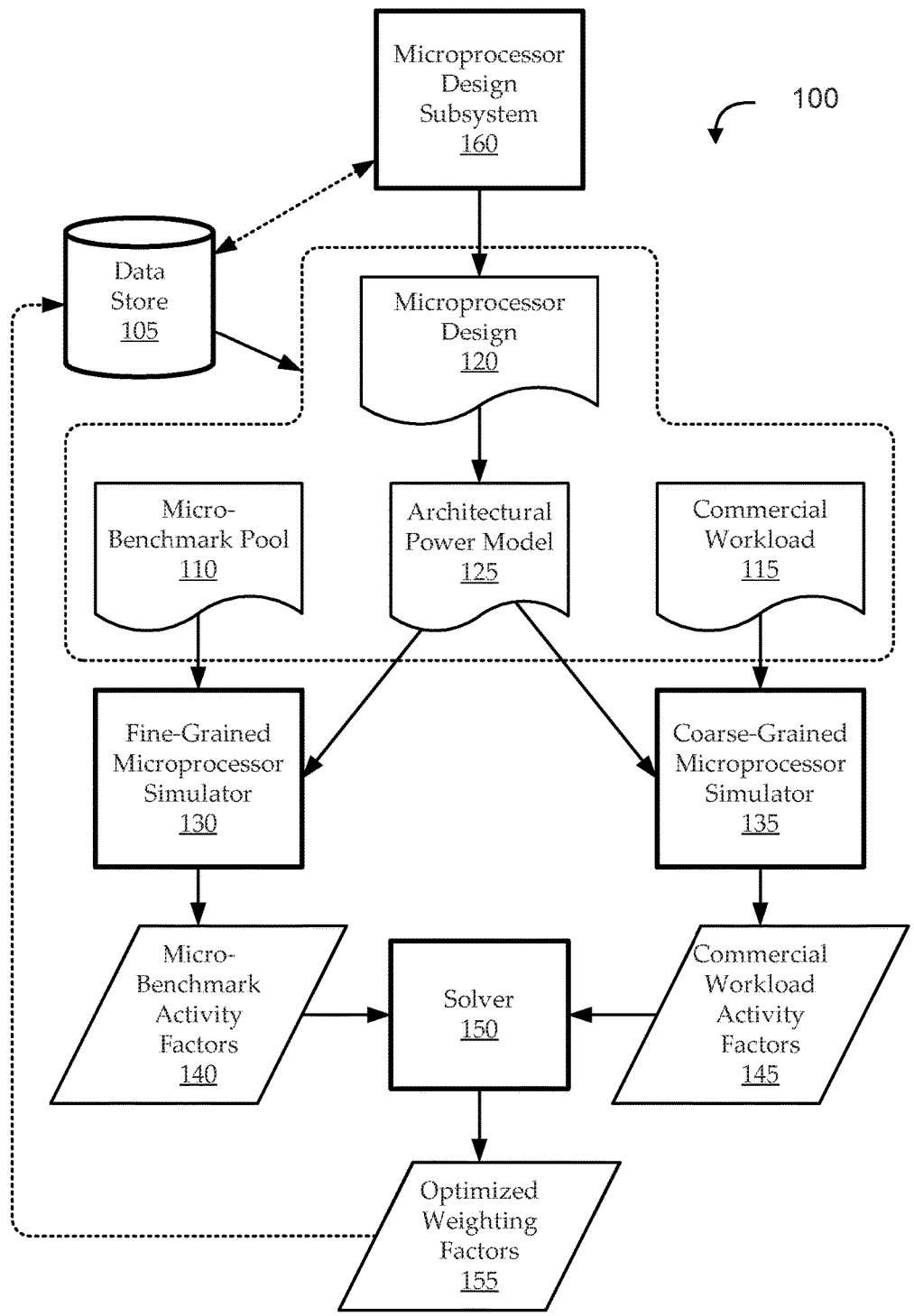
FIG. 1, a microprocessor design optimization system is shown for use with various embodiments.

Turning first to FIG. 1, a microprocessor design optimization system 100 is shown for use with various embodiments. The microprocessor design optimization system 100 includes a fine-grained microprocessor simulator 130, a coarse-grained microprocessor simulator 135, and a solver 155, all in communication with a data store 105. Some embodiments are in communication with a microprocessor design system 160.

For the sake of illustration, and as will be described more fully below, designers use a microprocessor design system 160 to generate a microprocessor design 120, from which an architectural power model 125 can be generated (e.g., designed, derived, etc.). The microprocessor design 120 can be intended to operate within a predetermined commercial workload 115, and the design effort can seek to ensure that the microprocessor design 120 will satisfy certain specifications, requirements, etc. when subjected to the commercial workload 115. For example, the commercial workload 115 can include long-running sets of instructions that cause the microprocessor to consume certain amounts of power when executed, and the microprocessor can be designed to operate with a desired amount of reliability, over some desired amount of time, under certain environmental conditions, etc.

Implementations of the architectural power model 125 can determine an activity factor (AF) of key architectural behaviors, such as "instruction fetch," "decode," "register rename," "functional unit execution," etc. Each behavior can be associated with certain power, which can be extracted from pre-silicon. Simulations can effectively count the number of times a particular key architectural behavior is exercised per cycle, which can be represented as the AF for that behavior under that simulation. For example, an AF of "2" can indicate that the associated behavior was exercised twice per cycle. The AF can be used to understand an amount (e.g., and location on the microprocessor) of power consumption expected to result from that behavior.

The AF can be simulated using the fine-grained microprocessor simulator 130 and/or the coarse-grained microprocessor simulator 135. Embodiments of the coarse-grained microprocessor simulator 135 can use a high-level microprocessor model (e.g., a so-called "performance model") that is detailed enough to provide useful simulation results for exploring and evaluating certain key parameters, but coarse enough to be able to simulate expected commercial and/or other longer running workloads without excessive resources (e.g., within a reasonable timeframe, with reasonable computing resources, etc.). For example, such models tend not to approach the detail of lower-level models until late in the design process. Embodiments of the fine-grained microprocessor simulator 130 can use a register transfer logic (RTL) level microprocessor model, or the like, to perform a fine-grained simulation. Such fine-grained simulations can tend to facilitate more detailed analyses, such as of various activity factors and clock-gating opportunities, but their simulations tend to be appreciably more time-intensive and resource-intensive. For example, RTL-based simulations can tend to be impractical for simulating long-running, commercial workloads (e.g., an actual expected workload), such as Standard Performance Evaluation Corporation's (SPEC) standard central processing unit (CPU) workload ("SPEC CPU"), Java business benchmark workload ("SPEC JBB"), Java enterprise edition workload ("SPEC jEnterprise"), etc. Accordingly, fine-grained simulations tend to be more useful for simulating micro-benchmarks.

As illustrated, the fine-grained microprocessor simulator 130 can be used to generate micro-benchmark activity factors 140, and the coarse-grained microprocessor simulator 135 can be used to generate commercial workload activity factors 145. For the sake of illustration, the following table includes some sample AF results:

| Sub-unit behavior | stradd00 | linklist01 | SPEC JBB2012 |
|---|---|---|---|
| ICD_R | 0.8 | 0.23 | 0.8 |
| ICD_W | 0.01 | 0.01 | 0.06 |
| SEL_R | 0.8 | 0.94 | 0.93 |
| SEL_Write_CNT | 2.31 | 0.82 | 2.94 |
| ARF_R | 2.98 | 3.3 | 2.31 |
| ARF_W | 1.76 | 0.46 | 1.22 |
| WRF_R | 4.23 | 3.96 | 2.94 |
| WRF_W | 1.82 | 0.25 | 2.49 |
| PKU_W | 2.52 | 0.26 | 2.36 |
| DCA_R | 0.45 | 0.23 | 0.4 |
| DCA_W | 0.02 | 0.01 | 0.1 |

The table shows the AF determined for various key architectural behavior, such as I-Cache read and write ("ICD_R" and "ICD_W"), select unit read and write ("SEL_R" and "SEL_Write_CNT"), register file read and write ("ARF_R," "ARF_W," "WRF_R," and "WRF_W"), pick unit write ("PKU_W"), and D-Cache read and write ("DCA_R" and "DCA_W"), each as simulated using two different micro-benchmarks "stradd00" and "linklist01" and one commercial workload "SPEC JBB2012."

When using finer-grained (e.g., RTL-based) models, simulations often employ micro-benchmarks that define specific conditions using appreciably smaller instructions sets to allow the lower-level simulation to run within a reasonable amount of time. For example, tens to hundreds of instructions can correspond to kernels in common algorithms (e.g., "bsearch," "linklist traversal," "sorting," etc.), defined "corner-case" scenarios (e.g., "power viruses," "pause diag," etc.), etc. While such micro-benchmarks are commonly used for power optimization of microprocessor designs, the workload conditions provided by those micro-benchmarks are often appreciably different from dynamic or average behaviors of actual workload conditions. It can be seen from the table above that the AF results can differ when the same architectural behavior is simulated under different types of workload conditions, such as different micro-benchmark conditions or commercial workload conditions. This can indicate that using any particular micro-benchmark for simulation may not provide AF results that faithfully represent those likely to be seen under commercial workload conditions.

Some embodiments provide techniques for using the fine-grained microprocessor simulator 130 to generate micro-benchmark activity factors 140 from a micro-benchmark pool 110 in a manner that can faithfully represent simulation under commercial workload 115 without having to perform a long-running, resource intensive, fine-grained simulation under the commercial workload 115. Embodiments can use the fine-grained microprocessor simulator 130 to identify the suite of micro-benchmarks 110, each corresponding to a micro-benchmark workload condition for the microprocessor design 120, and to simulate, under each micro-benchmark workload condition, fine-grained operation of the architectural power model 125 to generate a set of micro-benchmark activity factors 140 for the micro-benchmark workload condition, each micro-benchmark activity factor 140 indicating an amount of activity monitored for a respective one of a number of sub-units of the architectural power model 125 under the micro-benchmark workload condition. The coarse-grained microprocessor simulator 135 can be used to simulate coarse-grained operation of the architectural power model 125 to generate a set of commercial workload activity factors 145, each commercial workload activity factor 145 indicating an amount of activity monitored for each respective one of the number of sub-units of the architectural power model 125 under a commercial workload condition.

As will be described more fully below, a solver 150 can perform a number of functions according to the micro-benchmark activity factors 140 and the commercial workload activity factors 145. Some implementations of the solver 150 can calculate a metric to evaluate whether (e.g., and to what extent) the behavior of one or more micro-benchmarks 110 is close to that of the commercial workload 115. For example, the metric can compare average power and the detailed behavior of some or all fine-grained sub-units of the architectural power model 125. Other implementations of the solver 150 can calculate a set of optimized weighting factors 155 as a function of the micro-benchmark activity factors 140 and the commercial workload activity factors 145 to apply to the suite of micro-benchmarks 110 to yield a weighted aggregate micro-benchmark workload condition that substantially approximates the commercial workload condition 115. For example, the solver 150 can use convex optimization, heuristic algorithms, and/or other techniques described herein to associate each of a set of micro-benchmarks from the micro-benchmark pool 110 with a weighting factor, so that the aggregate (e.g., weighted average) behavior is closest to the commercial workload 115.

Figure 2:
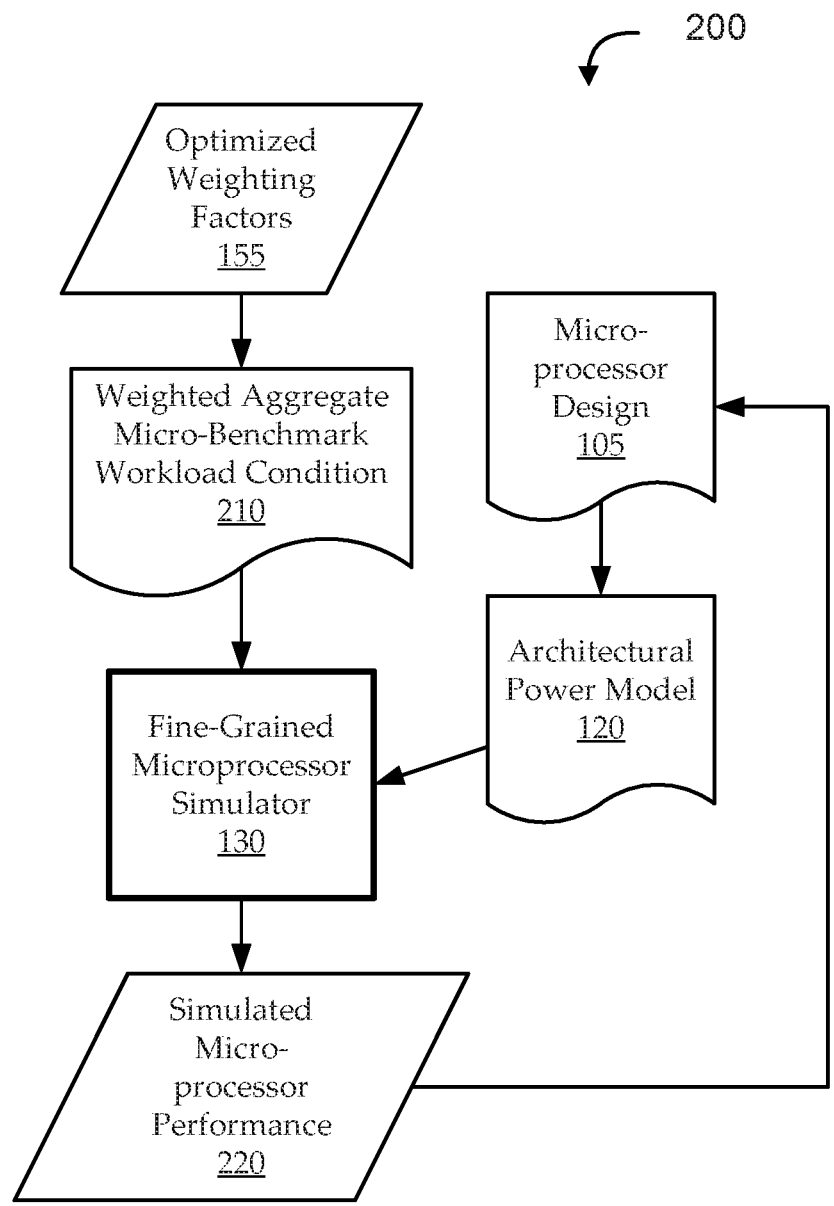
FIG. 2 shows a simplified block diagram of a partial design optimization system that exploits the solved set of optimized weighting factors to facilitate efficient iterative design, according to various embodiments.

FIG. 2 shows a simplified block diagram of a partial design optimization system 200, such as a portion of the design optimization system 100 of FIG. 1, that exploits the solved set of optimized weighting factors 155 to facilitate efficient iterative design, according to various embodiments. As illustrated, the set of optimized weighting factors 155 can be applied to the suite of micro-benchmarks 110 to yield a weighted aggregate micro-benchmark workload condition 210. As described with reference to FIG. 1, a microprocessor design 120 can be used to generate an architectural power model 125. The architectural power model 125 and the weighted aggregate micro-benchmark workload condition 210 can be used by a fine-grained microprocessor simulator 130 to generate simulated microprocessor performance 220.

The various systems described above in FIGS. 1 and 2 can be implemented in various ways, including in hardware and/or software, each in a single device, or with functions spread among multiple devices, components, systems, etc. Some implementations can include one or more Application Specific Integrated Circuits (ASICs) adapted to perform a subset of the applicable functions in hardware. Other implementations can have functions performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers.

Figure 3:
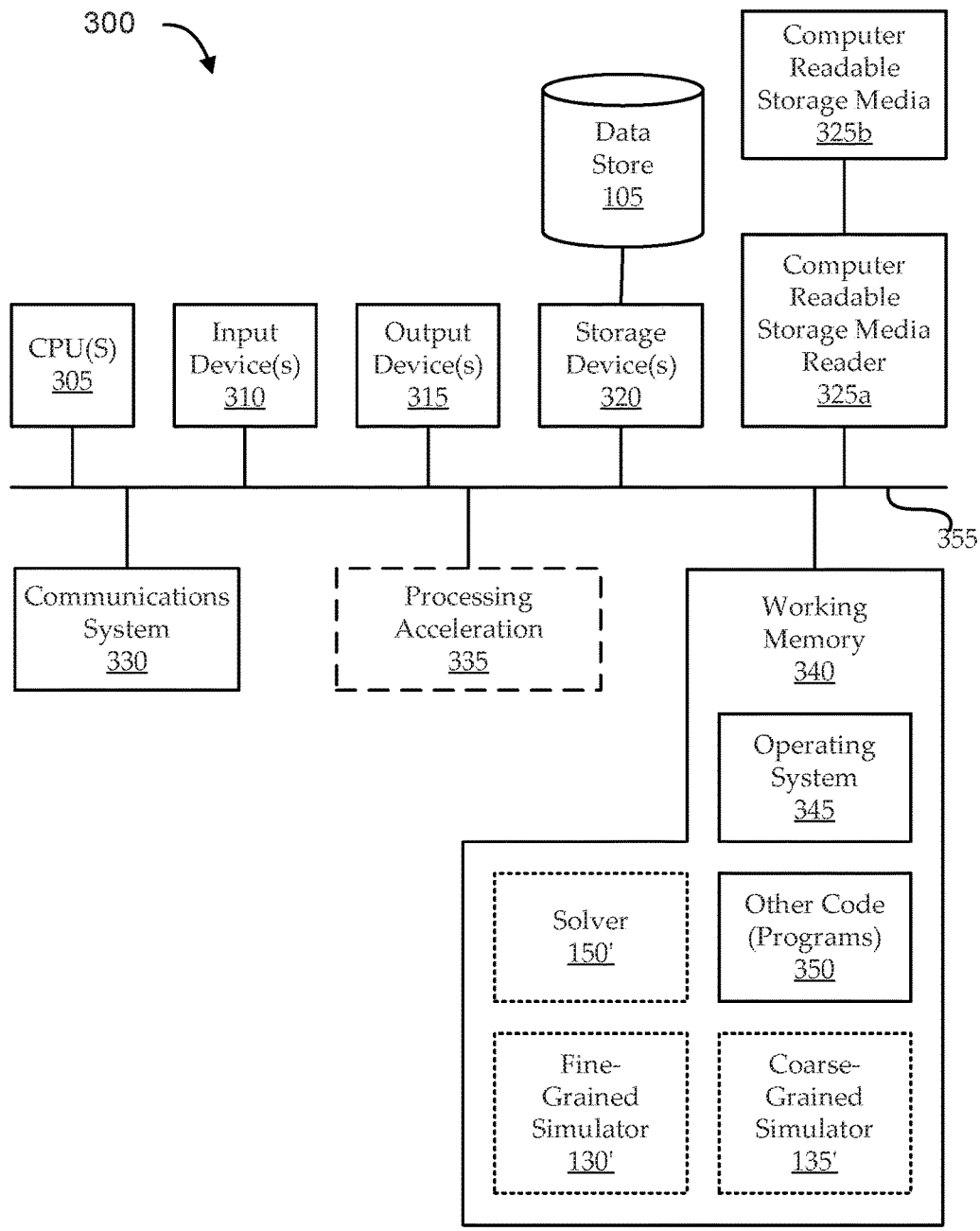
FIG. 3 shows an illustrative computational system for implementing certain functionality of a design optimization system, according to various embodiments.

FIG. 3 shows an illustrative computational system 300 for implementing certain functionality of a design optimization system, according to various embodiments. The computational system 300 can include or perform functionality of components of design optimization system 100 of FIG. 1, such as those described above. For the sake of simplicity, the computational system 300 is shown including hardware elements that can be electrically coupled via a bus 355. However, embodiments of the computational system 300 can be implemented as or embodied in single or distributed computer systems, in one or more locations, or in any other useful way.

The hardware elements can include a set of (e.g., one or more) central processing units (CPUs) 305, one or more input devices 310 (e.g., a mouse, a keyboard, etc.), and one or more output devices 315 (e.g., a display device, a printer, etc.). The computational system 300 can also include one or more storage devices 320. By way of example, storage device(s) 320 can be disk drives, optical storage devices, solid-state storage device such as a random access memory (RAM) and/or a read-only memory (ROM), which can be programmable, flash-updateable and/or the like. In some embodiments, the storage devices 320 can include or can be in communication with data stores 105 for storing the micro-benchmark pool 110, commercial workload 115, microprocessor design 120, architectural power model 125, optimized weighting factors 155, and/or any other suitable data, for example, as described above.

The computational system 300 can additionally include a computer-readable storage media reader 325a, a communications system 330 (e.g., a modem, a network card (wireless or wired), an infra-red communication device, etc.), and working memory 340, which can include RAM and ROM devices as described above. In some embodiments, the computational system 300 can also include a processing acceleration unit 335, which can include a DSP, a special-purpose processor and/or the like. The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 can permit data to be exchanged with a network and/or any other computer described above with respect to the computational system 300.

The computational system 300 can also include software elements, shown as being currently located within a working memory 340, including an operating system 345 and/or other code 350, such as an application program (which can be a client application, web browser, mid-tier application, relational database management system (RDBMS), etc.). In some embodiments, one or more functions of the design optimization system can be implemented as application code 350 in working memory 340. For example, working memory 340 (or any other suitable non-transient memory) can store instructions, which, when executed, can cause the set of processors 305 to perform functions of the fine-grained simulator 130', coarse-grained simulator 135', solver 150', etc.

It will be appreciated that the design optimization systems shown in FIGS. 1-3 illustrate only some of many implementations of such systems for providing the functionality described herein. Further, the embodiments described above and/or other embodiments can be used to provide various types of functionality, including functionality of the methods described below. The method embodiments described below can also be performed using system embodiments other than those described above.

Figure 4:
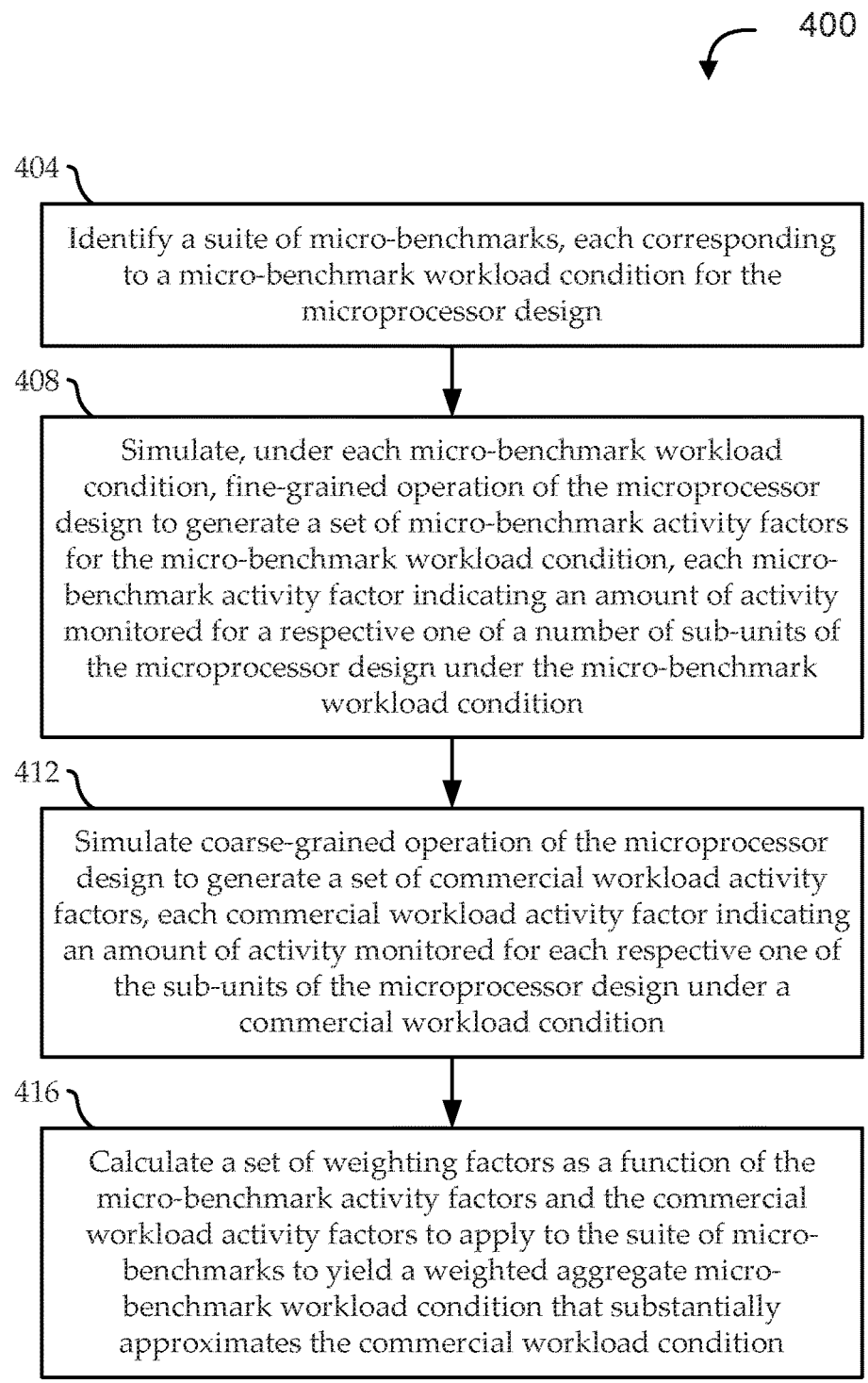
FIG. 4 shows a flow diagram of an illustrative method for optimizing micro-benchmark analysis of a microprocessor design, according to various embodiments.

FIG. 4 shows a flow diagram of an illustrative method 400 for optimizing micro-benchmark analysis of a microprocessor design, according to various embodiments. Embodiments of the method 400 begin at stage 404 by identifying a suite of micro-benchmarks, each corresponding to a micro-benchmark workload condition for the microprocessor design. For example, each micro-benchmark can include tens to hundreds of instructions that correspond to kernels in common algorithms (e.g., "bsearch," "linklist traversal," "sorting," etc.), defined "corner-case" scenarios (e.g., "power viruses," "pause diag," etc.), etc. Typically, such micro-benchmarks can efficiently be simulated, even by fine-grained simulators, because of their relatively short instruction sets, runtimes, etc.

At stage 408, embodiments can simulate, under each micro-benchmark workload condition, fine-grained operation of the microprocessor design to generate a set of micro-benchmark activity factors for the micro-benchmark workload condition. For example, the simulation can use an RTL-level microprocessor model to achieve a fine-grained simulation result. Each micro-benchmark activity factor can indicate an amount of activity monitored for a respective one of a plurality of sub-units of the microprocessor design under the micro-benchmark workload condition. For example, the activity factor can represent a count of the number of times a key architectural behavior is exercised per cycle according to an architectural power model of the microprocessor.

At stage 412, embodiments can simulate coarse-grained operation of the microprocessor design to generate a set of commercial workload activity factors. Each commercial workload activity factor can indicate an amount of activity monitored for each respective one of the plurality of sub-units of the microprocessor design under a commercial workload condition. For example, the coarse-grained simulation can use a microprocessor model that is only as detailed as needed to produce desired performance results from the simulation. It is noted that, while embodiments describe "fine-grained" and "coarse-grained" models and simulations, such terms are intended to be relative. Further, some embodiments can use a fine-grained model in place of the coarse-grained model for certain functionality. For example, some implementations can replace the coarse-grained simulation with a fine-grained simulation run for the commercial workload condition. Even though the commercial workload may consume large amounts of resources to simulate at the fine-grained level, limited fine-grained simulation of the commercial workload condition can generate more precise baseline simulation results from which to derive optimized weighting factors. This can still yield appreciable efficiencies in certain instances, such as for iterative design processes.

At stage 416, a set of weighting factors can be calculated as a function of the micro-benchmark activity factors and the commercial workload activity factors to apply to the suite of micro-benchmarks to yield a weighted aggregate micro-benchmark workload condition that substantially approximates the commercial workload condition. For example, an optimized set of weighting factors can be determined by calculating a difference between an aggregate (e.g., averaged) behavior of simulated results from a suite of micro-benchmarks to those of a commercial workload, and then calculating a set of weighting factors that minimizes that difference.

Embodiments can use similarities between simulated activity factors as an analog for similarities between benchmarks. For example, the illustrative activity factors table above shows that, with respect to an I-Cache Read behavior of the microprocessor, the "stradd00" micro-benchmark simulation yields the same activity factor as the "SPEC JBB2012" commercial workload simulation, but both differ from the activity factor as determined under a "linklist01" micro-benchmark simulation. Accordingly, the "stradd00" micro-benchmark appears to be a good analog for the "SPEC JBB2012" commercial workload, but only for one particular bun-unit behavior. With respect to an I-Cache Write behavior of the microprocessor, the "stradd00" micro-benchmark simulation yields the same activity factor as the "linklist01" micro-benchmark simulation, but both differ from the activity factor as determined under the "SPEC JBB2012" commercial workload simulation. Accordingly, for that limited case, the micro-benchmarks appears to yield similar results, but neither is a good analog for the "SPEC JBB2012" commercial workload, even for just this sub-unit behavior. Practically, if all activity factors between two benchmarks are similar, embodiments consider the benchmarks to have similar behavior.

Typically, as discussed above, any single benchmark is likely to yield at least some different activity factors from any other single benchmark. Some embodiments seek to determine how different a suite or set of (i.e., one or more) benchmarks are from another suite or set of benchmarks. For example, some embodiments calculate a difference between an aggregate behavior of a suite of micro-benchmarks and a behavior of a commercial workload.

According to some implementations, for micro-benchmark j, AF(j) contains the activity factor (AF) of all its key behaviors. Thus, AF(j) can be expressed as a vector. Using the illustrative activity factors table as an example, the vector can be:

$$AF(j) = \begin{bmatrix} ICD\_R^{(j)} \\ ICD\_W^{(j)} \\ SEL\_R^{(j)} \\ SEL\_W^{(j)} \\ \vdots \end{bmatrix}.$$

The power associated with the key architectural behaviors can also be expressed as a vector C, such that the power consumed by each architectural behavior for micro-benchmark j can be expressed as AF(j).*C:

$$C.*AF(j) = \begin{bmatrix} ICD\_R^{(j)}\_power \\ ICD\_W^{(j)}\_power \\ SEL\_R^{(j)}\_power \\ SEL\_W^{(j)}\_power \\ \vdots \end{bmatrix}.$$

Embodiments can assign weighting factors Wj for each benchmark, where j goes from 1 to N with N being the total number of micro-benchmarks in the benchmark pool. For example, the weighted average activity factors can be represented as:

$$ave\_AF =$$

$$w_1 * \begin{bmatrix} ICD\_R^{(1)} \\ ICD\_W^{(1)} \\ SEL\_R^{(1)} \\ SEL\_W^{(1)} \\ \vdots \end{bmatrix} + w_2 * \begin{bmatrix} ICD\_R^{(2)} \\ ICD\_W^{(2)} \\ SEL\_R^{(2)} \\ SEL\_W^{(2)} \\ \vdots \end{bmatrix} + \ldots + w_N * \begin{bmatrix} ICD\_R^{(N)} \\ ICD\_W^{(N)} \\ SEL\_R^{(N)} \\ SEL\_W^{(N)} \\ \vdots \end{bmatrix},$$

or $$ave\_AF = \begin{bmatrix} ICD\_R^{(1)}\_power & \ldots & ICD\_R^{(N)}\_power \\ ICD\_W^{(1)}\_power & \ldots & ICD\_W^{(N)}\_power \\ SEL\_R^{(1)}\_power & \ldots & SEL\_R^{(N)}\_power \\ SEL\_W^{(1)}\_power & \ldots & SEL\_W^{(N)}\_power \\ \vdots & & \vdots \end{bmatrix} * \begin{bmatrix} w_1 \\ w_2 \\ \vdots \\ w_n \end{bmatrix}$$

The power difference between the micro-benchmark suites and the commercial workload (e.g., or any target workload "Target_AF") can be expressed as the following "aggregate power difference formula":

$$\|sum\{Wj*C.*AF(j), \text{ for } j=1 \ldots N\} - C.*Target\_AF\|,$$

where $\| \ldots \|$ computes a root of sum of square of every element in the vector. Accordingly, the aggregate power difference formula effectively computes the sum of square of power difference related to all architectural behavior. This can also be expressed in a matrix format as:

$$\left\| \sum_{j=1}^{N} C.*AF(j)*w_j - C.*AF_{target} \right\| =$$

$$\left\| \begin{bmatrix} ICD\_R^{(1)}\_power & \ldots & ICD\_R^{(N)}\_power \\ ICD\_W^{(1)}\_power & \ldots & ICD\_W^{(N)}\_power \\ SEL\_R^{(1)}\_power & \ldots & SEL\_R^{(N)}\_power \\ SEL\_W^{(1)}\_power & \ldots & SEL\_W^{(N)}\_power \\ \vdots & & \vdots \end{bmatrix} * \begin{bmatrix} w_1 \\ w_2 \\ \vdots \\ w_n \end{bmatrix} - \begin{bmatrix} ICD\_R^{(target)}\_power \\ ICD\_W^{(target)}\_power \\ SEL\_R^{(target)}\_power \\ SEL\_W^{(target)}\_power \\ \vdots \end{bmatrix} \right\|$$

The above aggregate power difference formula is in the form "(A×W)−B," where "A×W" effectively represents a weighted aggregate power for each of a set of sub-unit behaviors across a set of micro-benchmarks, and "B" effectively represents a power for each of the same set of sub-unit behaviors across a commercial workload. The difference, then, can effectively provide a measure of a difference between an aggregate behavior of a suite of micro-benchmarks and a behavior of a commercial workload.

Some embodiments seek to minimize the difference between the aggregate behavior of a suite of micro-benchmarks and the behavior of a commercial workload. For example, finding a weighted set of micro-benchmarks that, in aggregate, can faithfully represent commercial workload behavior of a microprocessor (e.g., across a predetermined set of sub-units of the architectural power model) can allow fine-grained simulation of the micro-benchmarks to be used as an analog to simulation under the full commercial workload. Use of the micro-benchmarks in such a manner can increase the efficiency of the simulation, particularly in iterative design environments where the simulation may be run a number of times. Using the above aggregate power difference formula, some embodiments can seek a set of weighting factors (e.g., vector "W") that minimizes the difference to approach zero. To that end, the aggregate power difference formula can be transformed into the following format:

$$\min_{w_j, j=1 \ldots N} \|A*W - B\|^2, \text{ subject to } w_j \geq 0.$$

Various implementations provide solutions in different ways. One set of implementations uses a so-called "Convex Optimization" approach to solve the minimization problem. For example, a convex optimization-based solution can be expressed as:

$$\frac{\partial \|A*W-B\|^2}{\partial W_j} = 0, \text{if } W_j \geq 0$$

$$\frac{\partial \|A*W-B\|^2}{\partial W_j} > 0, \text{if } W_j = 0$$

Another set of implementations uses a gradient descent approach to solve the minimization problem. For example, a gradient descent-based solution can be expressed in the following pseudo-code:

```
Randomize all Wj with Wj > 0
Loop until all Wj satisfy the criterion showing above {
    Compute the gradient of ‖ A * W –B ‖ 2
    if Wj > 0 {
```
$$W_j = W_j - \alpha * \frac{\partial \|A*W-B\|^2}{\partial W_j} > 0$$
```
    if Wj < 0
        WJ = 0
    }
}
```

For example, the gradient descent approach begins by selecting some set of weighting factors. The initial set can be random, arbitrary, best guess, or any other suitable factor values. The approach continues iteratively to compute gradients and adjust weighting factors accordingly until the minimization criteria are met.

Another set of implementations uses a heuristic approach to solve the minimization problem. For example, a heuristic-based solution can be expressed as:

$$\nabla_W \|A*W-B\|^2 = (A^T A)W - A^T B = 0$$

$$W = (A^T A)^{-1} A^T B$$

It is noted that the heuristic-based approach does not include the constraint of Wj>=0. However, in practice, some of Wj can be negative. For example, some of the micro-benchmarks can contribute to the aggregate in a manner that is "opposite" other micro-benchmarks with respect to the commercial workload. Accordingly, in the heuristic-based approach, implementations can rule out the micro-benchmark with the largest negative |Wj| from the candidate pool in a given iteration, recomputed the A and W matrices, and proceed with the heuristic approach until all Wj>=0. A final set of micro-benchmarks to use as the weighted suite of micro-benchmarks can then be any micro-benchmarks corresponding to a W component having a positive coefficient. The heuristic-based approach can also be expressed in pseudo-code as follows:

```
Compute the gradient and compute the optimal W
until all elements in W have positive coefficients {
    find j for which |Wj| is the maximum for all Wj < 0
    rule out micro-benchmark j from candidate micro-benchmark pool
    compute the gradient and compute the optimal W
}
```

The various approaches, including the convex optimization-based or heuristic-based approaches, can generate a suite of micro-benchmarks having all positive Wj coefficients. Applying the coefficients as weighting factors can result in an aggregate (e.g., averaged) behavior that is close to that of the commercial workload in all sub-units (or all pre-selected sub-units) across the microprocessor.

In some instances, the summation of all Wj coefficients may not be 1.0. For example, in a multi-threaded environment, some micro-benchmarks may be single-threaded, while others may be multi-threaded; and the commercial workload is likely to be multi-threaded. Accordingly, some implementations pre-process the candidate micro-benchmark pool to remove constant power components, which are not related to certain activity factors (e.g., leakage power, "idle dynamic power," etc.).

Having generated a set of micro-benchmarks to use in aggregate, some embodiments can further seek to determine whether the resulting set of micro-benchmarks includes enough micro-benchmarks to faithfully represent the commercial workload. For example, it can be desirable to use different types of micro-benchmarks, such as different algorithm kernels or different corner scenarios, when solving the minimization problem described above. Some implementations check the result against a predetermined threshold. For example, the set of micro-benchmarks can be said to be sufficient if the result from the aggregate power difference formula is less than five percent of the total power.

In cases where the resulting set of micro-benchmarks appears insufficient, some embodiments observe which parts of the key architectural behavior tend to contribute to larger error. For example, if the commercial workload has higher I-Cache miss rates, which can result in higher I-Cache write power than is simulated by any of the set of micro-benchmarks, one or more additional and/or alternative micro-benchmarks can be included in the set having sufficiently high I-Cache miss rates (e.g., or otherwise simulating the appropriate levels of I-Cache write power).

Having generated an optimally weighted set of micro-benchmarks to use for simulation, some embodiments use the set of micro-benchmarks to analyze and/or optimize power in the microprocessor design. One such embodiment can run a fine-grained (e.g., RTL) simulation of the microprocessor with all the micro-benchmarks in the set. For any targeted circuit block, the simulation results can be used to extract the power for the targeted circuit block, the associated weighting factor can be used to report the weighted average power for the targeted block. As described above, deriving the weighted aggregate power in this manner should yield a result that is close to the average power for the real commercial workload.

Using the above techniques can provide various features, in addition to those described above. One feature is that such approaches can appreciably reduce burdens on microprocessor modeling groups. For example, using conventional approaches, high-level models typically must be as detailed (or close to as detailed) as the real microprocessor design, so that designers can extract all the information they use for their design. These implementation details are often unnecessary for high-level and cycle-accurate simulations, and the details can often change quickly in early design stages, can be missing from early-stage models, can be difficult to verify for correctness in high-level models, etc. Using the approaches described herein, as long as key architectural behaviors in the high-level model sufficiently match the actual design, the simulations can yield useful results even when underlying implementation details are different.

While the above systems and methods are described with reference to microprocessor designs, similar techniques can be applied for any type of design process in which application-specific benchmarks are known and micro-benchmark pools can be built. For example, the embodiments can be used for designing and/or analyzing application specific integrated circuits (ASICs), or the like. Further, while the above systems and methods are described with reference to commercial workloads, similar techniques can be applied to mimic the architectural behavior of any suitable workload phase. For example, any phase of a commercial, test, or special-purpose workload can be expressed in terms of target activity factors (e.g., "Target_AF"), and the weighting factors can be determined to closely represent that target workload.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for optimizing micro-benchmark analysis of a microprocessor design, the system comprising:
a non-transient memory having stored thereon an architectural power model of the microprocessor design;
a first computer-implemented circuit simulator that operates to:
identify a suite of micro-benchmarks, each corresponding to a micro-benchmark workload condition for the microprocessor design; and
simulate, under each micro-benchmark workload condition, fine-grained operation of the architectural power model to generate a set of micro-benchmark activity factors for the micro-benchmark workload condition, each micro-benchmark activity factor indicating an amount of activity monitored for a respective one of a plurality of sub-units of the architectural power model under the micro-benchmark workload condition;
a second computer-implemented circuit simulator that operates to simulate coarse-grained operation of the architectural power model to generate a set of commercial workload activity factors, each commercial workload activity factor indicating an amount of activity monitored for each respective one of the plurality of sub-units of the architectural power model under a commercial workload condition, wherein the architectural power model of the microprocessor design comprises a plurality of monitors, wherein each monitor is configured to count occurrences of one or more of a predetermined set of key architectural behaviors in a respective one of the sub-units, wherein each of the first and second computer-implemented circuit simulators operate to monitor the amount of activity for each respective one of the plurality of sub-units of the microprocessor design according to the occurrences counted by the monitors, wherein each of the predetermined set of key architectural behaviors is associated with an amount of power consumed by the sub-unit when the key architectural behavior occurs such that the set of micro-benchmark activity factors for each micro-benchmark workload condition indicates a power consumption of the microprocessor design under the micro-benchmark workload condition and the set of commercial workload activity factors indicates a power consumption of the microprocessor design under the commercial workload condition; and a computer-implemented solver that operates to calculate a set of weighting factors as a function of the micro-benchmark activity factors and the commercial workload activity factors to apply to the suite of micro-benchmarks to yield a weighted aggregate micro-benchmark workload condition representing a total power consumption of the micro-benchmark workload that substantially approximates a total power consumption of the commercial workload condition.

2. The system of claim 1, wherein the computer-implemented solver operates to calculate by minimizing a difference between the weighted aggregate micro-benchmark workload condition and the commercial workload.

3. The system of claim 1, wherein the first computer-implemented circuit simulator operates to simulate fine-grained operation of the architectural power model by performing a register transfer logic (RTL) level simulation of the architectural power model.

4. The system of claim 1, wherein the computer-implemented solver operates to calculate the set of weighting factors by:

minimizing a difference between a weighted aggregate micro-benchmark workload condition and the commercial workload by applying a minimize function to:

$\|W^*A-B\|^2$, subject to all elements of Wj being non-negative, wherein:

$\|\ldots\|$ computes a root of sum square of elements of a vector;

A is a matrix corresponding to the weighted aggregate micro-benchmark workload condition and defined by:

sum{$Wj^*C.^*AF(j)$, for $j=1\ldots N$};

B is a matrix corresponding to the commercial workload and defined by:

$C.^*Target\_AF$;

each j corresponds to one of N micro-benchmarks in the suite of micro-benchmarks;

AF(j) is a vector corresponding to the set of micro-benchmark activity factors for the micro-benchmark workload condition associated with micro-benchmark j;

Target_AF is a vector corresponding to the set of commercial workload activity factors for the commercial workload condition;

C is a vector corresponding to a power consumption associated with each key architectural behavior; and Wj is a vector corresponding to the set of weighting factors applied to the N micro-benchmarks.

5. The system of claim 1, wherein the commercial workload is defined as a plurality of target activity factors, and wherein the set of weighting factors are calculated to minimize a difference between a) an aggregate of the set of micro-benchmark activity factors and the set of commercial workload activity factors and b) an aggregate of the target activity factors.

6. A system comprising:
a set of processors;

a non-transient memory having stored thereon an architectural power model of the microprocessor design and instructions for optimizing micro-benchmark analysis of a microprocessor design, the instructions, when executed, causing the set of processors to perform steps comprising:

identifying a suite of micro-benchmarks, each corresponding to a micro-benchmark workload condition for the microprocessor design;

simulating, under each micro-benchmark workload condition, fine-grained operation of the architectural power model to generate a set of micro-benchmark activity factors for the micro-benchmark workload condition, each micro-benchmark activity factor indicating an amount of activity monitored for a respective one of a plurality of sub-units of the architectural power model under the micro-benchmark workload condition;

simulating coarse-grained operation of the architectural power model to generate a set of commercial workload activity factors, each commercial workload activity factor indicating an amount of activity monitored for each respective one of the plurality of sub-units of the architectural power model under a commercial workload condition, wherein the architectural power model of the microprocessor design comprises a plurality of monitors, wherein each monitor is configured to count occurrences of one or more of a predetermined set of key architectural behaviors in a respective one of the sub-units, where the instructions cause the set of processors to perform each of the simulating steps by monitoring the amount of activity for each respective one of the plurality of sub-units of the microprocessor design according to the occurrences counted by the monitors, and wherein each of the predetermined set of key architectural behaviors is associated with an amount of power consumed by the sub-unit when the key architectural behavior occurs such that the set of micro-benchmark activity factors for each micro-benchmark workload condition indicates a power consumption of the microprocessor design under the micro-benchmark workload condition and the set of commercial workload activity factors indicates a power consumption of the microprocessor design under the commercial workload condition; and calculating a set of weighting factors as a function of the micro-benchmark activity factors and the commercial workload activity factors to apply to the suite of micro-benchmarks to yield a weighted aggregate micro-benchmark workload condition representing a total power consumption of the micro-benchmark workload that substantially approximates a total power consumption of the commercial workload condition.

7. The system of claim 6, wherein the instructions cause the set of processors to perform the calculating by minimizing a difference between the weighted aggregate micro-benchmark workload condition and the commercial workload.

8. The system of claim 6, wherein the commercial workload is defined as a plurality of target activity factors, and wherein the set of weighting factors are calculated to minimize a difference between a) an aggregate of the set of micro-benchmark activity factors and the set of commercial workload activity factors and b) an aggregate of the target activity factors.

* * * * *

UNITED STATES PATENT AND TRADEMARK OFFICE
CERTIFICATE OF CORRECTION

PATENT NO. : 10,102,323 B2
APPLICATION NO. : 15/291459
DATED : October 16, 2018
INVENTOR(S) : Zhang et al.

It is certified that error appears in the above-identified patent and that said Letters Patent is hereby corrected as shown below:

In the Specification

In Column 11, Line 19, delete "Wj" and insert -- $W_j$ --, therefor.

In Column 11, Line 20, delete "WJ" and insert -- $W_j$ --, therefor.

Signed and Sealed this
Fourteenth Day of January, 2020

Andrei Iancu
*Director of the United States Patent and Trademark Office*